1

2,780,515
METHOD FOR IMPROVED PRECIPITATION OF URANIUM PEROXIDE

Arthur J. Miller, Oak Ridge, Tenn., and Burnett M. Pitt, Evanston, and Philip F. Grieger, Urbana, Ill., assignors, by mesne assignments, to the United States of America as represented by the United States Atomic Energy Commission No Drawing. Application September 1, 1950,
Serial No. 182,888

9 Claims. (Cl. 23—14.5)

The present invention relates in general to recovery of hexavalent uranium values from aqueous solutions, and more particularly to an improved method for precipitating $UO_4$ from aqueous solutions containing iron.

As is known, aqueous acidic solutions of uranium, upon being processed in ferrous-metal apparatus, commonly become contaminated with dissolved ferric, as well as other metal, salts. This contamination has proven to be particularly deleterious to selective recovery of the uranium from such solutions by precipitation as uranium peroxide with $H_2O_2$ in the conventional manner. The contamination, principally the $Fe^{+3}$ salts, has been found to cause catalytic decomposition of the precipitant, $H_2O_2$, often at such a rapid rate that quantitative precipitation of the uranium is impossible, and the precipitate obtained is contaminated with an undesirably high Fe content.

This effect is especially detrimental in processes for peroxide recovery of uranium from very dilute solutions containing hexavalent uranium concentrations of ca. 0.1 to 3 percent by weight. Here, the difficulty is magnified by the fact that the $Fe^{+3}$ contamination may often be several times that of the uranium concentration. Further details concerning typical processes wherein solutions of this nature obtain may be found in co-pending applications, for example: Ser. No. 617,126, filed September 18, 1945, in the name of Albert E. Ballard, for Process for the Recovery of U in the Presence of Iron, now U. S. Patent 2,733,128, and Ser. No. 629,667, filed November 19, 1945, in the name of Albert E. Ballard, for Recovery of U from Wash Liquids.

Of various methods, devised prior to the present invention, for inhibiting this difficulty, those involving refrigeration of the solutions and thereupon conducting the peroxide precipitation at temperatures maintained just above the freezing point have appeared to afford the most improvement. It happens that in the cold, the rate of catalytic decomposition of $H_2O_2$ is beneficially reduced, resulting in more complete $UO_4$ precipitation. However, such low temperature operation has not proven to be unqualifiedly successful for the purpose; in practice, serious operational difficulties have been encountered. In particular, the precipitates, when formed in the cold, are of very fine crystal size—much smaller than those obtained at room temperatures. This crystalline condition greatly increases the difficulty of effectively removing the precipitates from their supernatants, often detracting considerably from the efficiency of such removal. Furthermore, on plant scale, the low temperature procedure normally requires special processing apparatus provided with refrigeration equipment, thus precluding simple application to existing $UO_4$ operations without extensive apparatus alterations. In view of these, and other disadvantageous characteristics of precipitation in the cold, it has become highly desirable that other improved methods, of at least commensurate efficacy and preferably effective simply at room temperature, be found for overcoming the obtaining $UO_4$ precipitation difficulties. The present invention provides such a method.

Accordingly, one object of the present invention is to provide a new and improved method for selective recovery of hexavalent uranium values, by precipitation as uranium peroxide, from aqueous solutions containing the same together with dissolved iron.

Another object is to provide such a method which affords substantially quantitative recovery of the uranium values as a $UO_4$ precipitate of desirably low Fe contamination.

A further object is to provide such a method wherein the $UO_4$ may be satisfactorily precipitated at room temperature to afford thereby a coarse-crystalline, easily-separable precipitate.

Still another object is to provide such a method which is particularly applicable to very dilute solutions containing uranium concentrations of the low order of ca. 0.1 to 3 percent by weight of solution.

Other objects will become apparent hereinafter.

In accordance with the present invention, an improved method for separating and recovering hexavalent uranium values from aqueous acidic solutions containing the same together with $Fe^{+3}$ ions comprises incorporating malonate ions in the solution to selectively form a soluble iron-malonate complex with said $Fe^{+3}$ ions, thereupon adding hydrogen peroxide to the malonate-containing solution to precipitate said uranium values therefrom as uranium peroxide, and thereafter separating the resulting precipitate from its supernatant liquid. It has been found that complexing the $Fe^{+3}$ with malonate in this manner strongly inhibits both Fe-catalyzed decomposition of the precipitant, $H_2O_2$ and co-precipitation of iron with the $UO_4$ precipitate. With these detractive effects so inhibited, more complete $UO_4$ precipitation with considerably less Fe contamination beneficially results. For example, when applied to uranium peroxide precipitations at room temperature from aqueous acidic solutions 0.5% in U and 0.1% in $Fe^{+3}$, the incorporation of as little as 0.02 M malonate ion was found capable of increasing the amount of uranium subsequently precipitated from 84.6% to 99.9%, while reducing the Fe contamination of the precipitate from 0.35% to a bare minimal 0.07%. In addition, by virtue of precipitation at room temperature in this manner, the precipitates were found to be characteristically of coarse crystalline texture, and therefore easily separable from their supernatants. By the same token, no special refrigeration equipment is required to satisfactorily conduct the room-temperature precipitation. Having such beneficial attributes, the present process clearly affords significant practical advantages over earlier processes for the purpose.

Applicants have further discovered that for the present purpose the malonate ion, specifically, is unique among organic agents generally, in that it does not itself adversely interfere with the peroxide precipitation. That is, attempts to achieve equivalent improvement with various other polycarboxylates and other similar organic agents, revealed that, as a generality, those organic agents which tended to complex $Fe^{+3}$ also deleteriously increased the solubility of $UO_4$—apparently due to concomitant complexing of uranium. In addition, some polycarboxylates appeared to actually aid the decomposition of $H_2O_2$, or to induce precipitation of iron. However, among all such agents tried, the malonate ion, specifically, proved to be an outstanding exception, in that it does not significantly manifest such deleterious effects.

Aqueous acidic solutions, containing dissolved uranyl values, which may be treated in accordance with the present invention are subject to wide variation. To contain the uranyl values in dissolved form as specified, the solution should be maintained moderately acidic, since the uranium tends to disadvantageously hydrolyze and precipitate as peruranate compounds at pH's above about 3 to 3.5. On the other hand, it has been found advisable that the acidity should not be greater than about pH 1, because higher acidities tend to excessively shift the presumed peroxide reaction equilibrium:

$$UO_2^{++} + H_2O_2 \rightleftharpoons UO_4 + 2H^+$$

to the left, and in addition seriously attenuate the rate of precipitation. Accordingly, the preferred pH range is about 1 to 3, with pH 2 being the empirically-determined optimum. Naturally, anions of the acid employed, as well as any other extraneous material permitted in the solution, should not deleteriously interfere, through their own particular activity, with the precipitation operation. The nitrate ion, having the least tendency, among suitable common anions, toward reducing rate of precipitation or adversely affecting the peroxide reaction equilibrium, is thus eminently satisfactory in this respect. Accordingly, nitric acid is the particularly preferred acid, and uranyl nitrate the preferred form for the uranium values. With regard to uranium concentration, peroxide precipitation of uranium from solutions of virtually any concentration may be enhanced by malonate incorporation in accordance with the present invention. However, at concentrations below 0.1% U (by weight), the $UO_4$ precipitates obtained become difficult to filter satisfactorily; uranium concentrations above this value are therefore preferred. While successful results are more easily obtained as greater concentrations of uranium are treated, nevertheless the process has proven especially effective when applied to solutions so dilute as 0.1 to 3% U.

Having provided a suitable uranyl solution, the present process is applied thereto. A source of malonate ions is dissolved in the uranyl solution. Since the solution is desirably maintained acidic, the malonate ions may most conveniently, and preferably, be incorporated in the form of malonic acid. While any amount of malonate ion, however small, should have some beneficial effect, it is preferred in the interest of obtaining most complete and satisfactory precipitation that molar ratios of malonic acid to iron of 1:1 to 3:1 be employed. A ratio of 2:1 has been empirically determined to be the generally-applicable optimum. The high solubility of malonic acid (750 gm./liter) enables such ratios to be easily provided for any concentration of iron likely to be practically encountered under the circumstances involved. Upon so incorporating malonate ions, the $UO_4$ precipitation is then effected by adding hydrogen peroxide to the solution; addition in the form of a 30% aqueous $H_2O_2$ solution has been found convenient. It is preferred to employ considerably more hydrogen peroxide than the stoichiometric equivalent of the U content, in order to provide a sufficient excess to allow for $H_2O_2$ decomposition, and to establish a satisfactory precipitation rate so as to conclude the precipitation in a reasonable time, say at most an hour. In this regard, it has been found desirable to use at least a 0.3 M excess of $H_2O_2$, and preferably an excess of 0.7 M or more. In instances where the $Fe^{+3}$ content is notably great, especially where the $Fe^{+3}$ concentration exceeds that of U, it is desirable to further mitigate total $H_2O_2$ decomposition by adding the peroxide gradually, say over a period of a half hour. Since the solution will normally tend to become more acidic during precipitation in accordance with the reaction scheme set forth above, it is preferable to gradually add $NH_4OH$, or other suitable base, in amounts appropriate for maintaining the pH within the preferred limits. Precipitation may be advantageously accelerated, especially in large plant-scale applications, by mildly agitating the system. In general, the entire precipitation operation proceeds quite satisfactorily at room temperature.

After adding all of the $H_2O_2$, agitation of the system is preferably continued until completion of the precipitation.

Thereupon, it is desirable to immediately separate the precipitate from the supernatant solution, to avoid gradual dissolution of the $UO_4$ as progressive $H_2O_2$ decomposition disrupts the aforementioned reaction equilibrium. The separation is ordinarily easily effected by any suitable method such as filtration, centrifugation, decantation, or the like, in view of the advantageous coarse-crystalline precipitate texture normally obtained by the present method. Conventional filtration through a glass cloth has proven to be eminently satisfactory for this purpose.

Further illustration of the quantitative aspects and preferred conditions and procedures of the present method is provided in the following specific examples. Example I demonstrates generally the improvement afforded by the present malonate method for precipitating $UO_4$ from Fe-contaminated solutions, as compared with similar precipitations wherein no malonate is employed.

EXAMPLE I

To equal volumes of aqueous nitric acid solutions containing 0.5% by weight of uranium in the form of uranyl nitrate and contaminated with 0.1% by weight of $Fe^{+3}$, was added malonic acid in amounts equivalent to the molar ratios indicated below. Thereupon, while maintaining the solutions at 25° C., 70 cc. of 30% $H_2O_2$ per liter of solution was added to each, thereby providing an $H_2O_2$ excess of substantially 0.7 M over the stoichiometric amount required for precipitation of all U as $UO_4$. $UO_4$ slowly precipitated. The pH's of the solutions were held constant at their indicated values by periodic additions of $NH_4OH$ during the reaction. Precipitation appeared completed after three hours, at which time the samples were filtered through double filter paper and the precipitates washed with equal solution volumes of water. The results of subsequent analyses of the precipitates and filtrates are tabulated in Table I below.

*Table I*

ENHANCEMENT OF $UO_4$ PRECIPITATION WITH MALONIC ACID

U = 0.5% (by wt.)
Fe = 0.1% (by wt.)
$H_2O_2$ = 0.7 M excess
Wash = $H_2O$ (equal to solution volume)
Temp. = 25° C.

| pH | Moles Malonic Acid Per Mole Fe | Mg. U/ Liter¹ In Effluent | U Recovery, Percent | | Fe in ppt. (percent by wt. of ppt.) |
| --- | --- | --- | --- | --- | --- |
| | | | Effluent Anal. | Ppt. Anal. | |
| 1.5 | 0 | 360 | 84.6 | 89.5 | 0.35 |
| 1.5 | 1 | 90 | 96.15 | 97.6 | 0.06 |
| 1.5 | 2 | 1 | 99.96 | 99.5 | 0.07 |
| 1.5 | 3 | 2.4 | 99.90 | 98.9 | 0.08 |
| 2.5 | 2 | 6.8 | 99.71 | 99.7 | 0.07 |
| 2.5 | 3 | 0.8 | 99.97 | 99.8 | 0.06 |

¹ Effluent = filtrate + washings.

The efficacy of the present malonate method, both in affording virtually quantitative uranium precipitation and in mitigating iron contamination of the precipitate, is clearly evidenced by the results set forth in Table I. The preferability of employing at least 2 moles of malonic acid per mole of iron is also apparent. Along this line, it is of interest to investigate the effects of the various quantitative parameters on the performance of the process. Such investigation is made upon a quantity of typical uranium plant solution in following Example II.

EXAMPLE II

A volume of uranium-containing aqueous acidic wash solution, withdrawn from a uranium plant processing stream immediately preceding a uranium peroxide precipitation operation, was found to contain as dissolved constituents:

U=4.43% by wt.
Fe=0.036% by wt.
Cu=5–10% of U wt.
Ni=1.9–3.8% of U wt.
Cr=1.7–3.4% of U wt.
Al=1.7–3.4% of U wt.
Minor metals=1.5% of U wt.
$Cl^-$=75% of metal wt.
$NO_3^-$=25% of metal wt.

This volume of solution was divided into a number of equal portions, to which $NH_4OH$ was added to adjust the pH to the values indicated below. In some portions the iron concentration was increased as indicated by addition of $Fe^{+3}$. Malonic acid was added in the indicated proportion. Thereupon, excess 30% $H_2O_2$ was added gradually while agitating the system, along with $NH_4OH$ to hold the pH constant until completion of the reaction (in about 3 minutes). Then the remainder of the desired $H_2O_2$ was added rapidly. After 3 hours, the precipitates were filtered through double filter paper and washed with 3% $H_2O_2$. Results of analyses of precipitates and filtrates are tabulated in Table II below.

Table II
EFFECT OF MALONIC ACID CONCENTRATION, pH, AND IRON CONTENT ON PEROXIDE PRECIPITATION OF U U=0.43% (by wt.)
$H_2O_2$=0.7 M excess
Wash=0.7 M $H_2O_2$ (equal to ½ solution volume)
Temp.=25° C.

| pH | Fe Content, Percent (by wt.) | Moles Malonic Acid Per Mole Fe | Mg. U/Liter in Filtrate | U Recovery,[1] Percent |
|---|---|---|---|---|
| 1.5 | .036 | 0 | 679 | 75.82 |
| 1.5 | .036 | 1 | 240 | 91.24 |
| 1.5 | .036 | 2 | 33 | 98.80 |
| 1.5 | .036 | 3 | 9 | 99.67 |
| 1.5 | .036 | 6 | 3 | 99.89 |
| 1.5 | .036 | 10 | 3 | 99.89 |
| 2.0 | .036 | 2 | 1.5 | 99.95 |
| 2.0 | .036 | 3 | 7.5 | 99.73 |
| 2.5 | .036 | 2 | 7.5 | 99.73 |
| 2.5 | .036 | 3 | 0.6 | 99.98 |
| 3.0 | .036 | 2 | 6.0 | 99.78 |
| 3.0 | .036 | 3 | 1.5 | 99.95 |
| 2.0 | .14 | 2 | 6.9 | 99.75 |
| 2.0 | .14 | 3 | 3.4 | 99.87 |
| 2.5 | .14 | 2 | 2.1 | 99.92 |
| 2.5 | .14 | 3 | | |
| 2.0 | .34 | 2 | 7.5 | 99.73 |
| 2.0 | .34 | 3 | 6 | 99.78 |
| 2.5 | .34 | 2 | 43 | 98.43 |
| 2.5 | .34 | 3 | 71 | 97.41 |

[1] Based on filtrate analysis.

The results in Table II illustrate the effectiveness of the present method when applied to actual plant solutions, containing various metal contaminants. From the observed data, it is seen that, for solutions as dilute as these, the optimum pH is ca. 2, and the optimum molar ratio of malonate to iron is also ca. 2. It is also significant that the process was still capable of affording substantially quantitative precipitation of uranium, despite the ten-fold increase in iron concentration. The extent of such iron contamination which the present process may tolerate under the circumstances and still afford virtually quantitative results is illustrated in Example III following.

EXAMPLE III

Synthetic aqueous nitric acid-uranyl nitrate solutions, containing various concentrations of $Fe^{+3}$, were prepared. The present $UO_4$ precipitation was applied thereto, proceeding as in Examples I and II, with the exception that the precipitate was filtered only one hour after the start of $H_2O_2$ addition. Results are tabulated in Table III.

Table III
IRON TOLERANCE FOR SUBSTANTIALLY QUANTITATIVE $UO_4$ PRECIPITATION pH=2
U (percent by wt.)=3.0
Temp.=25° C.
$H_2O_2$ added=0.3 M excess
Malonic acid=2 moles/mole Fe

| Percent Fe (by wt.) | Mg. U/Liter in Filtrate | U Recovery, Percent |
|---|---|---|
| 0.3 | 2.2 | 99.99 |
| 0.5 | 8.0 | 99.96 |
| 0.6 | 6.0 | 99.98 |
| 0.75 | 50.0 | 99.83 |

With regard to the results of Example III, it has been found that, in general, upon applying the present method to solutions having ca. 0.1 to 3% uranyl concentrations, substantially quantitative uranium recovery is consistently afforded up to Fe contamination levels as high as 0.75%. This is well borne out by the data in Table III, where it may be observed that even when the minimum preferred excess of $H_2O_2$ was used in the face of so high a uranium concentration as 3%, it was not until the Fe concentration reached 0.75% that the high degree of quantitativeness of U recovery commenced to noticeably decrease. Even then, the U recovery was still well over 99%.

Finally, Example IV illustrates the great decrease in $H_2O_2$ decomposition resulting from incorporation of malonate in the solution, in the present manner.

EXAMPLE IV

A series of comparative precipitations, following the procedure of Example III, was conducted. However, here, analysis was directed to the amount of $H_2O_2$ remaining in the system one hour after its addition. Results are tabulated in Table IV below.

Table IV
INHIBITION OF FE-INDUCED $H_2O_2$ DECOMPOSITION WITH MALONATE

| Percent Fe (by wt.) | Moles Malonic Acid per Mole Fe | $H_2O_2$ Added, M | $H_2O_2$ After 1 hr., M |
|---|---|---|---|
| 0.05 | 0 | 0.30 | 0.039 |
| 0.10 | 0 | 0.30 | 0.0016 |
| 0.03 | 2 | 0.30 | 0.27 |
| 0.10 | 2 | 0.30 | 0.27 |
| 0.15 | 2 | 0.30 | 0.25 |
| 0.20 | 2 | 0.30 | 0.24 |
| 0.30 | 2 | 0.30 | 0.27 |
| 0.75 | 2 | 0.30 | 0.25 |

While this invention has been described with particular reference to its application to the processing of, specifically, very dilute aqueous uranium wash solutions, it is inherently of much wider applicability. The present process is well adapted to inhibiting Fe-induced decomposition of $H_2O_2$ and thus beneficially reducing $H_2O_2$ precipitant requirements, and enhancing precipitation efficacy, without concomitantly interfering with $UO_4$ precipitation, in the precipitation of $UO_4$ from uranium solutions generally, regardless of the absolute or relative concentrations of U and Fe encountered. Furthermore, in view of the fact that substantially quantitative precipitation of uranium with virtually no co-precipitation of iron is afforded, the present method clearly constitutes an improved method for selectively separating uranium values from iron values. Various additional applications of the hereinbefore-disclosed methods will become apparent to those skilled in the art. It is, therefore, to be understood that all matters contained in the above description and examples are illustrative only and do not limit the scope of the present invention.

What is claimed is:

1. An improved method for separating and recovering hexavalent uranium values from an aqueous acidic solution containing the same together with ferric ions, which comprises incorporating malonate ions in said solution, thereupon adding hydrogen peroxide to the malonate-containing solution to precipitate said uranium values therefrom as uranium peroxide, and thereafter separating the resulting uranium-containing precipitate from its supernatant liquid.

2. An improved method for separating and recovering hexavalent uranium values from an aqueous acidic solution containing the same together with ferric ions, which comprises incorporating malonic acid in said solution, thereupon adding hydrogen peroxide to the malonic-acid-containing solution to precipitate said uranium values therefrom as uranium peroxide, and thereafter separating the resulting uranium-containing precipitate from its supernatant liquid.

3. An improved method for separating and recovering hexavalent uranium values from an aqueous nitric acid solution containing the same together with ferric ions, which comprises incorporating malonate ions in said solution, thereupon while maintaining the pH of the malonate-containing solution within the approximate range of 1 to 3, adding hydrogen peroxide thereto to precipitate said uranium values therefrom as uranium peroxide, and thereafter separating the resulting uranium-containing precipitate from its supernatant liquid.

4. An improved method for separating and recovering hexavalent uranium values from an aqueous nitric acid solution containing the same together with ferric ions, which comprises incorporating in said solution malonic acid, in amount within the approximate range of one to three moles per mole of said ferric ions present, thereupon while maintaining the pH of the malonic-acid-containing solution within the approximate range of 1 to 3, adding hydrogen peroxide thereto to precipitate said uranium values therefrom as uranium peroxide, and thereafter separating the resulting uranium-containing precipitate from its supernatant liquid.

5. An improved method for separating and recovering hexavalent uranium values from an aqueous nitric acid solution containing the same together with ferric ions, which comprises incorporating malonic acid in said solution, thereupon while maintaining the pH of the malonic-acid-containing solution within the approximate range of 1 to 3, adding hydrogen peroxide thereto, in at least a 0.3 M excess over the stoichiometric amount, to precipitate said uranium values therefrom as uranium peroxide, and thereafter separating the resulting uranium-containing precipitate from its supernatant liquid.

6. An improved method for separating and recovering hexavalent uranium values from an aqueous acidic solution containing the same in a concentration within the approximate range of 0.1 to 3 percent by weight of solution together with ferric ions, which comprises incorporating malonic acid in said solution, thereupon adding hydrogen peroxide to the malonic-acid-containing solution to precipitate said uranium values therefrom as uranium peroxide, and thereafter separating the resulting uranium-containing precipitate from its supernatant liquid.

7. An improved method for separating and recovering hexavalent uranium values from an aqueous nitric acid solution containing the same in a concentration within the approximate range of 0.1 to 3 percent by weight of solution together with ferric ions, which comprises incorporating in said solution malonic acid, in amount within the approximate range of one to three moles per mole of said ferric ions present, thereupon while maintaining the pH of the malonic-acid-containing solution within the approximate range of 1 to 3, adding hydrogen peroxide thereto, in at least a 0.3 M excess over the stoichiometric amount, to precipitate said uranium values therefrom as uranium peroxide, and thereafter separating the resulting uranium containing precipitate from its supernatant liquid.

8. An improved method for separating and recovering hexavalent uranium values from an aqueous nitric acid solution containing the same in a concentration within the approximate range of 0.1 to 3 percent uranium by weight of solution together with ferric ions, which comprises incorporating in said solution substantially two moles of malonic acid per mole of ferric ions present, thereupon while maintaining the malonic-acid-containing solution at substantially pH 2 by appropriate addition of ammonium hydroxide, adding hydrogen peroxide thereto, in a substantially 0.7 M excess over the stoichiometric amount, to precipitate said uranium values therefrom as uranium peroxide, and thereafter separating the resulting uranium-containing precipitate from its supernatant liquid.

9. An improved method for separating and recovering hexavalent uranium values from an aqueous acidic solution containing the same, together with ferric, chloride, and nitrate ions, and contaminated with dissolved: copper, nickel, chromium, and aluminum; which comprises incorporating malonic acid in said solution thereupon while maintaining the pH of the malonic-acid-containing solution within the approximate range of 1.5 to 3, adding hydrogen peroxide thereto to precipitate said uranium values therefrom as uranium peroxide, and thereafter separating the resulting uranium-containing precipitate from its supernatant liquid.

No references cited.